(12) United States Patent
Foret

(10) Patent No.: US 9,499,443 B2
(45) Date of Patent: Nov. 22, 2016

(54) APPARATUS AND METHOD FOR SINTERING PROPPANTS

(71) Applicant: Foret Plasma Labs, LLC, The Woodlands, TX (US)

(72) Inventor: Todd Foret, The Woodlands, TX (US)

(73) Assignee: Foret Plasma Labs, LLC, The Woodlands, TX (US)

( * ) Notice: Subject to any disclaimer, the term of this patent is extended or adjusted under 35 U.S.C. 154(b) by 77 days.

(21) Appl. No.: 14/103,820

(22) Filed: Dec. 11, 2013

(65) Prior Publication Data

US 2014/0170330 A1 Jun. 19, 2014

Related U.S. Application Data

(60) Provisional application No. 61/735,996, filed on Dec. 11, 2012.

(51) Int. Cl.
| | |
|---|---|
| H05H 1/48 | (2006.01) |
| H05H 1/42 | (2006.01) |
| C04B 38/00 | (2006.01) |
| C09K 8/80 | (2006.01) |

(52) U.S. Cl.
CPC ........... *C04B 38/0022* (2013.01); *C09K 8/805* (2013.01)

(58) Field of Classification Search
None
See application file for complete search history.

(56) References Cited

U.S. PATENT DOCUMENTS

| | | | |
|---|---|---|---|
| 481,979 A | 9/1892 | Stanley | |
| 501,732 A | 7/1893 | Roeske | |
| 1,698,096 A | 1/1929 | Hirschfeld | |
| 1,727,361 A | 9/1929 | Ashcraft | |
| 2,139,657 A | 12/1938 | Baeckler | |
| 2,260,823 A | 10/1941 | Bettis | |
| 2,705,219 A | 3/1955 | Heiskell et al. | |
| 2,784,294 A | 3/1957 | Gravert | |
| 2,898,441 A | 8/1959 | Reed et al. | |
| 2,923,809 A | 2/1960 | Clews et al. | |
| 3,004,189 A | 10/1961 | Giannini | |
| 3,082,314 A | 3/1963 | Arata et al. | |
| 3,131,288 A | 4/1964 | Browning et al. | |
| 3,201,337 A | 8/1965 | Eichelberger et al. | |

(Continued)

FOREIGN PATENT DOCUMENTS

| | | |
|---|---|---|
| CA | 2304938 A1 | 2/2001 |
| CN | 101905196 A | 12/2010 |

(Continued)

OTHER PUBLICATIONS

"Metalliferous Mining—Processing Cyclones Resource Book"—Aug. 2010, provided at https://rsteyn.files.wordpress.com/2010/07/cyclones-basics.pdf.*

(Continued)

*Primary Examiner* — Dah-Wei D Yuan
*Assistant Examiner* — Jose Hernandez-Diaz
(74) *Attorney, Agent, or Firm* — Daniel J. Chalker; Edwin S. Flores; Chalker Flores, LLP

(57) ABSTRACT

An apparatus and method sinters or partially sinters green pellets in a selected temperature range to make proppant particles as the green pellets pass through a first central portion of the first vortex gas flow and exit the second end of the first cylindrical vessel and/or pass through a second central portion of the second vortex flow and exit the fourth end of the second cylindrical vessel.

22 Claims, 11 Drawing Sheets

(56) References Cited

U.S. PATENT DOCUMENTS

| | | |
|---|---|---|
| 3,242,305 A | 3/1966 | Kane et al. |
| 3,254,770 A | 6/1966 | Herndon |
| 3,292,028 A | 12/1966 | Van Ornum |
| 3,324,334 A | 6/1967 | Reed |
| 3,328,235 A | 6/1967 | Schimkus |
| 3,428,125 A | 2/1969 | Parker |
| 3,522,846 A | 8/1970 | New |
| 3,534,388 A | 10/1970 | Ito et al. |
| 3,567,898 A | 3/1971 | Fein |
| 3,567,921 A | 3/1971 | Holiday |
| 3,598,731 A | 8/1971 | Frykhult et al. |
| 3,619,549 A | 11/1971 | Hogan et al. |
| 3,641,308 A | 2/1972 | Couch, Jr. et al. |
| 3,769,517 A | 10/1973 | Coleman |
| 3,772,172 A | 11/1973 | Zhagatspanian et al. |
| 3,783,167 A | 1/1974 | Tylko |
| 3,787,247 A | 1/1974 | Couch, Jr. |
| 3,798,784 A | 3/1974 | Kovats et al. |
| 3,826,920 A | 7/1974 | Woodroffe et al. |
| 3,830,428 A | 8/1974 | Dyos |
| 3,833,787 A | 9/1974 | Couch, Jr. |
| 3,917,479 A | 11/1975 | Sayce et al. |
| 3,924,246 A | 12/1975 | Scherer |
| 3,958,636 A | 5/1976 | Perkins |
| 3,998,477 A | 12/1976 | Delahaye et al. |
| 4,002,918 A | 1/1977 | Graentzel |
| 4,018,973 A | 4/1977 | Paton et al. |
| 4,067,390 A | 1/1978 | Camacho et al. |
| 4,169,503 A | 10/1979 | Scott |
| 4,203,022 A | 5/1980 | Couch, Jr. et al. |
| 4,265,747 A | 5/1981 | Copa et al. |
| 4,279,743 A | 7/1981 | Miller |
| 4,296,066 A | 10/1981 | Schenck |
| 4,311,897 A | 1/1982 | Yerushalmy |
| 4,317,041 A | 2/1982 | Schenck |
| 4,344,483 A | 8/1982 | Fisher et al. |
| 4,344,839 A | 8/1982 | Pachkowski et al. |
| 4,381,978 A | 5/1983 | Gratzel et al. |
| 4,382,469 A | 5/1983 | Bell et al. |
| 4,397,823 A | 8/1983 | Dimpfl |
| 4,427,636 A | 1/1984 | Obenshain |
| 4,448,935 A | 5/1984 | Iovine et al. |
| 4,454,835 A | 6/1984 | Walsh et al. |
| 4,463,245 A | 7/1984 | McNeil |
| 4,476,105 A | 10/1984 | Greenbaum |
| 4,477,283 A | 10/1984 | Wilson, Sr. |
| 4,488,935 A | 12/1984 | Ruhe |
| 4,508,040 A | 4/1985 | Santen et al. |
| 4,530,101 A | 7/1985 | Fey et al. |
| 4,531,043 A | 7/1985 | Zverina et al. |
| 4,544,470 A | 10/1985 | Hetrick |
| 4,554,435 A | 11/1985 | Wolf et al. |
| 4,567,346 A | 1/1986 | Marhic |
| 4,617,031 A | 10/1986 | Suh et al. |
| 4,622,115 A | 11/1986 | O'Neill |
| 4,624,765 A | 11/1986 | Cerkanowicz et al. |
| 4,626,648 A | 12/1986 | Browning et al. |
| 4,670,048 A | 6/1987 | Pineau |
| 4,670,139 A | 6/1987 | Spruiell et al. |
| 4,685,963 A | 8/1987 | Saville et al. |
| 4,761,793 A | 8/1988 | Digne et al. |
| 4,774,026 A | 9/1988 | Kitamori et al. |
| 4,776,638 A | 10/1988 | Hahn |
| 4,791,268 A | 12/1988 | Sanders et al. |
| 4,803,365 A | 2/1989 | Krause et al. |
| 4,863,608 A | 9/1989 | Kawai et al. |
| 4,868,127 A | 9/1989 | Blades et al. |
| 4,886,118 A | 12/1989 | Van Meurs et al. |
| 4,948,980 A | 8/1990 | Wedekamp |
| 4,957,773 A | 9/1990 | Spencer et al. |
| 4,998,486 A | 3/1991 | Digne et al. |
| 5,015,432 A | 5/1991 | Koloc |
| 5,019,256 A | 5/1991 | Ifill et al. |
| 5,019,268 A | 5/1991 | Rogalla |
| 5,045,288 A | 9/1991 | Raupp et al. |
| 5,048,404 A | 9/1991 | Bushnell et al. |
| 5,082,054 A | 1/1992 | Kiamanesh |
| 5,094,815 A | 3/1992 | Conboy et al. |
| 5,120,450 A | 6/1992 | Stanley, Jr. |
| 5,124,131 A | 6/1992 | Wekhof |
| 5,126,111 A | 6/1992 | Al-Ekabi et al. |
| 5,132,512 A | 7/1992 | Sanders et al. |
| 5,149,377 A | 9/1992 | Esrom et al. |
| 5,166,950 A | 11/1992 | Jouvaud et al. |
| 5,200,156 A | 4/1993 | Wedekamp |
| 5,227,053 A | 7/1993 | Brym |
| 5,243,169 A | 9/1993 | Tateno et al. |
| 5,326,530 A | 7/1994 | Bridges |
| 5,336,411 A | 8/1994 | Andersson |
| 5,348,629 A | 9/1994 | Khudenko |
| 5,368,724 A | 11/1994 | Ayres et al. |
| 5,403,399 A | 4/1995 | Kurihara et al. |
| 5,413,768 A | 5/1995 | Stanley, Jr. |
| 5,439,595 A | 8/1995 | Downey, Jr. |
| 5,439,652 A | 8/1995 | Sczechowski et al. |
| 5,451,738 A | 9/1995 | Alvi et al. |
| 5,472,567 A | 12/1995 | Torregrossa |
| 5,529,701 A | 6/1996 | Grisham et al. |
| 5,531,904 A | 7/1996 | Grisham et al. |
| 5,534,232 A | 7/1996 | Denes et al. |
| 5,609,736 A | 3/1997 | Yamamoto |
| 5,609,777 A | 3/1997 | Apunevich et al. |
| 5,611,896 A | 3/1997 | Swanepoel et al. |
| 5,637,127 A | 6/1997 | McLaughlin et al. |
| 5,655,210 A | 8/1997 | Gregoire et al. |
| 5,660,743 A | 8/1997 | Nemchinsky |
| 5,662,811 A | 9/1997 | Grisham et al. |
| 5,664,733 A | 9/1997 | Lott |
| 5,680,014 A | 10/1997 | Miyamoto et al. |
| 5,696,380 A | 12/1997 | Cooke et al. |
| 5,730,875 A | 3/1998 | Grisham et al. |
| 5,738,170 A | 4/1998 | Laverhne |
| 5,738,281 A | 4/1998 | Zurecki et al. |
| 5,746,984 A | 5/1998 | Hoard |
| 5,760,363 A | 6/1998 | Hackett et al. |
| 5,766,447 A | 6/1998 | Creijghton |
| 5,832,361 A | 11/1998 | Foret |
| 5,843,211 A | 12/1998 | Bielefeldt |
| 5,866,910 A | 2/1999 | Cooke et al. |
| 5,876,663 A | 3/1999 | Laroussi |
| 5,879,555 A | 3/1999 | Khudenko |
| 5,893,979 A | 4/1999 | Held |
| 5,908,539 A | 6/1999 | Young et al. |
| 5,979,551 A | 11/1999 | Uban et al. |
| 5,994,705 A | 11/1999 | Cooke et al. |
| 6,004,386 A | 12/1999 | Grisham et al. |
| 6,007,681 A | 12/1999 | Kawamura et al. |
| 6,019,947 A | 2/2000 | Kucherov |
| 6,054,097 A | 4/2000 | Mass et al. |
| 6,090,296 A | 7/2000 | Oster |
| 6,117,401 A | 9/2000 | Juvan |
| 6,182,585 B1 | 2/2001 | Gonopolsky et al. |
| 6,187,206 B1 | 2/2001 | Bernier et al. |
| 6,228,266 B1 | 5/2001 | Shim |
| 6,355,178 B1 | 3/2002 | Couture et al. |
| 6,362,449 B1 | 3/2002 | Hadidi et al. |
| 6,377,602 B1 | 4/2002 | Aita et al. |
| 6,410,880 B1 | 6/2002 | Putvinski et al. |
| 6,514,469 B1 | 2/2003 | Kado et al. |
| 6,565,803 B1 | 5/2003 | Bolton et al. |
| 6,630,113 B1 | 10/2003 | Surma |
| 6,693,253 B2 | 2/2004 | Boulos et al. |
| 6,713,771 B2 | 3/2004 | Nakagawa et al. |
| 6,749,759 B2 | 6/2004 | Denes et al. |
| 6,929,067 B2 | 8/2005 | Vinegar et al. |
| 6,942,786 B1 | 9/2005 | Fosseng |
| 6,987,792 B2 | 1/2006 | Do et al. |
| 7,081,171 B1 | 7/2006 | Sabol et al. |
| 7,086,468 B2 | 8/2006 | De Rouffignac et al. |
| 7,096,953 B2 | 8/2006 | De Rouffignac et al. |
| 7,121,342 B2 | 10/2006 | Vinegar et al. |
| 7,128,816 B2 | 10/2006 | Denes et al. |
| 7,153,398 B2 | 12/2006 | Duzhev et al. |
| 7,182,874 B2 | 2/2007 | Allard et al. |

(56) References Cited

U.S. PATENT DOCUMENTS

| | | |
|---|---|---|
| 7,422,695 B2 | 9/2008 | Foret |
| 7,536,975 B2 | 5/2009 | Denes et al. |
| 7,578,937 B2 | 8/2009 | Foret |
| 7,622,693 B2 | 11/2009 | Foret |
| 7,857,972 B2 | 12/2010 | Foret |
| 7,882,646 B2 | 2/2011 | Gorbell et al. |
| 7,893,408 B2 | 2/2011 | Hieftje et al. |
| 7,897,053 B2 | 3/2011 | Foret |
| 7,905,942 B1 | 3/2011 | Layman |
| 7,985,342 B2 | 7/2011 | Foret |
| 8,002,992 B2 | 8/2011 | Foret |
| 8,074,439 B2 | 12/2011 | Foret |
| 8,088,290 B2 | 1/2012 | Foret |
| 8,110,100 B2 | 2/2012 | Foret |
| 8,263,897 B2 | 9/2012 | Morrisroe |
| 8,278,810 B2 | 10/2012 | Foret |
| 8,324,523 B2 | 12/2012 | Foret |
| 8,329,044 B2 | 12/2012 | Foret |
| 8,337,709 B2 | 12/2012 | Foret |
| 8,338,709 B2 | 12/2012 | Kodama et al. |
| 8,343,342 B2 | 1/2013 | Foret |
| 8,357,873 B2 | 1/2013 | Foret |
| 8,366,925 B2 | 2/2013 | Foret |
| 8,568,663 B2 | 10/2013 | Foret |
| 8,597,523 B2 | 12/2013 | Foret |
| 8,641,898 B2 | 2/2014 | Foret |
| 8,734,643 B2 | 5/2014 | Foret |
| 8,734,654 B2 | 5/2014 | Foret |
| 8,764,978 B2 | 7/2014 | Foret |
| 8,810,122 B2 | 8/2014 | Foret |
| 8,833,054 B2 | 9/2014 | Foret |
| 8,904,749 B2 | 12/2014 | Foret |
| 9,051,820 B2 | 6/2015 | Foret |
| 2001/0046964 A1 | 11/2001 | Percel et al. |
| 2001/0047964 A1 | 12/2001 | Matherly et al. |
| 2002/0148562 A1 | 10/2002 | Aoyagi et al. |
| 2003/0024806 A1 | 2/2003 | Foret |
| 2003/0051992 A1 | 3/2003 | Rappa |
| 2003/0101936 A1 | 6/2003 | Lee |
| 2003/0150325 A1 | 8/2003 | Hyppanen |
| 2003/0179536 A1 | 9/2003 | Stevenson et al. |
| 2003/0213604 A1 | 11/2003 | Stevenson et al. |
| 2004/0020188 A1 | 2/2004 | Kramer et al. |
| 2004/0108280 A1 | 6/2004 | Saraceno |
| 2005/0013772 A1 | 1/2005 | Patton et al. |
| 2005/0087435 A1 | 4/2005 | Kong et al. |
| 2005/0151455 A1 | 7/2005 | Sato et al. |
| 2005/0155373 A1 | 7/2005 | Hirooka et al. |
| 2006/0086698 A1 | 4/2006 | Jackson |
| 2006/0104849 A1 | 5/2006 | Tada et al. |
| 2006/0151445 A1 | 7/2006 | Schneider |
| 2006/0163054 A1 | 7/2006 | Spitzl et al. |
| 2006/0196424 A1 | 9/2006 | Swallow et al. |
| 2006/0252974 A1 | 11/2006 | McVey et al. |
| 2007/0102152 A1 | 5/2007 | Forgeron |
| 2007/0104610 A1 | 5/2007 | Houston et al. |
| 2007/0196249 A1* | 8/2007 | Fridman ............... B01F 5/0068 422/186.04 |
| 2007/0240975 A1 | 10/2007 | Foret |
| 2007/0253874 A1 | 11/2007 | Foret |
| 2008/0058228 A1 | 3/2008 | Wilson |
| 2008/0202915 A1 | 8/2008 | Hieftje et al. |
| 2009/0118145 A1 | 5/2009 | Wilson et al. |
| 2009/0200032 A1 | 8/2009 | Foret |
| 2009/0235637 A1 | 9/2009 | Foret |
| 2009/0277774 A1* | 11/2009 | Foret ................... C02F 1/36 204/158.2 |
| 2010/0212498 A1 | 8/2010 | Salazar |
| 2011/0005999 A1 | 1/2011 | Randal |
| 2011/0022043 A1 | 1/2011 | Wandke et al. |
| 2011/0031224 A1 | 2/2011 | Severance, Jr. et al. |
| 2011/0223091 A1* | 9/2011 | Miller .................. B01D 53/18 423/372 |
| 2011/0225948 A1 | 9/2011 | Valeev et al. |
| 2012/0097648 A1 | 4/2012 | Foret |
| 2012/0205293 A1* | 8/2012 | Thanoo ................ F04F 5/44 209/235 |
| 2012/0227968 A1 | 9/2012 | Eldred et al. |
| 2012/0231981 A1 | 9/2012 | Eldred et al. |
| 2013/0020926 A1 | 1/2013 | Foret |

FOREIGN PATENT DOCUMENTS

| | | |
|---|---|---|
| CN | 202224255 U | 5/2012 |
| EP | 237216 A1 | 9/1987 |
| EP | 1707096 A2 | 10/2006 |
| EP | 1915940 A1 | 4/2008 |
| GB | 1224638 A | 3/1971 |
| JP | 2006-501980 | 1/2006 |
| JP | 2008238053 A | 10/2008 |
| KR | 101999009569 A | 2/1999 |
| KR | 1020040005107 | 1/2004 |
| RU | 2102587 C1 | 1/1998 |
| WO | 94/16809 | 8/1994 |
| WO | 99/04607 | 1/1999 |
| WO | 2007117634 A2 | 10/2007 |

OTHER PUBLICATIONS

Extended European Search Report 08840081 dated May 21, 2014.
PCT/US2014/2014/024991 [KIPO] International Search Report dated Aug. 6, 2014.
BLRBAC: "Recommended Good Practice for the Thermal Oxidation of Waste Streams in a Black Liquor Recovery Boiler." Published Oct. 6, 1999.
International Search Report and Written Opinion for PCT/US2009/033979 dated Sep. 15, 2009.
NISTIR 6341 "Simulating Fire Whirls".
NISTIR 6427 "The Fluid Dynamics of Whirls—An Inviscid Model".
PCT/US2013/074506 [KIPO] International Search Report dated Mar. 18, 2014.
PCT/US2014/030090 [KIPO] International Search Report dated Sep. 25, 2014.
International Search Report and Written Opinion for PCT/US2007/008640 dated Sep. 25, 2007.
Kavan, L., "Electrochemical Carbon," Chem Rev (1997), 97:3061-3082.
International Search Report and Written Opinion for PCT/US2007/008529 dated Jun. 11, 2008.
European Search Report 07755050.7 dated Dec. 29, 2011.
International Search Report [KIPO] PCT/US201/062941 dated Jan. 27, 2014.
International Search Report and Written Opinion for PCT/US2009/000937 dated Sep. 17, 2009.
International Search Report and Written Opinion for PCT/US2008/011926 dated Apr. 27, 2009.
Belani, A., "It's Time for an Industry Initiative on Heavy Oil," JPT Online accessed on Oct. 16, 2007 at http://www.spe.org/spe-app/spe/jpt/2006/06/mangement_heavy_oil.htm.
"Brandt, A. R., ""Converting Green River oil shale to liquid fuels with Alberta Taciuk Processor: energy inputs andgreenhouse gas emissions,"" Jun. 1, 2007".
Brandt, A. R., "Converting Green River oil shale to liquid fuels with the Shell in-situ conversion process: energy inputs and greenhouse gas emissions," Jun. 30, 2007.
Cones Brochure, The Double Life Corporation.
Lectures: On Illuminating Engineering Delivered at the John Hopkins University, Published 1911 Johns Hopkins Press, p. 140.
O'Drill MCM, A Pump & Value Mfg. Company Catalog.
Understanding in-situ combustion, www.HeavyOilinfo.com, accessed Oct. 16, 2007.
Unleashing the potential: Heavy Oil, Supplement to E&P Annual Reference Guide, www.eandp.info.com, Jun. 2007.
Extended European Search Report [EP 13862561.1] dated Jul. 7, 2016.

* cited by examiner

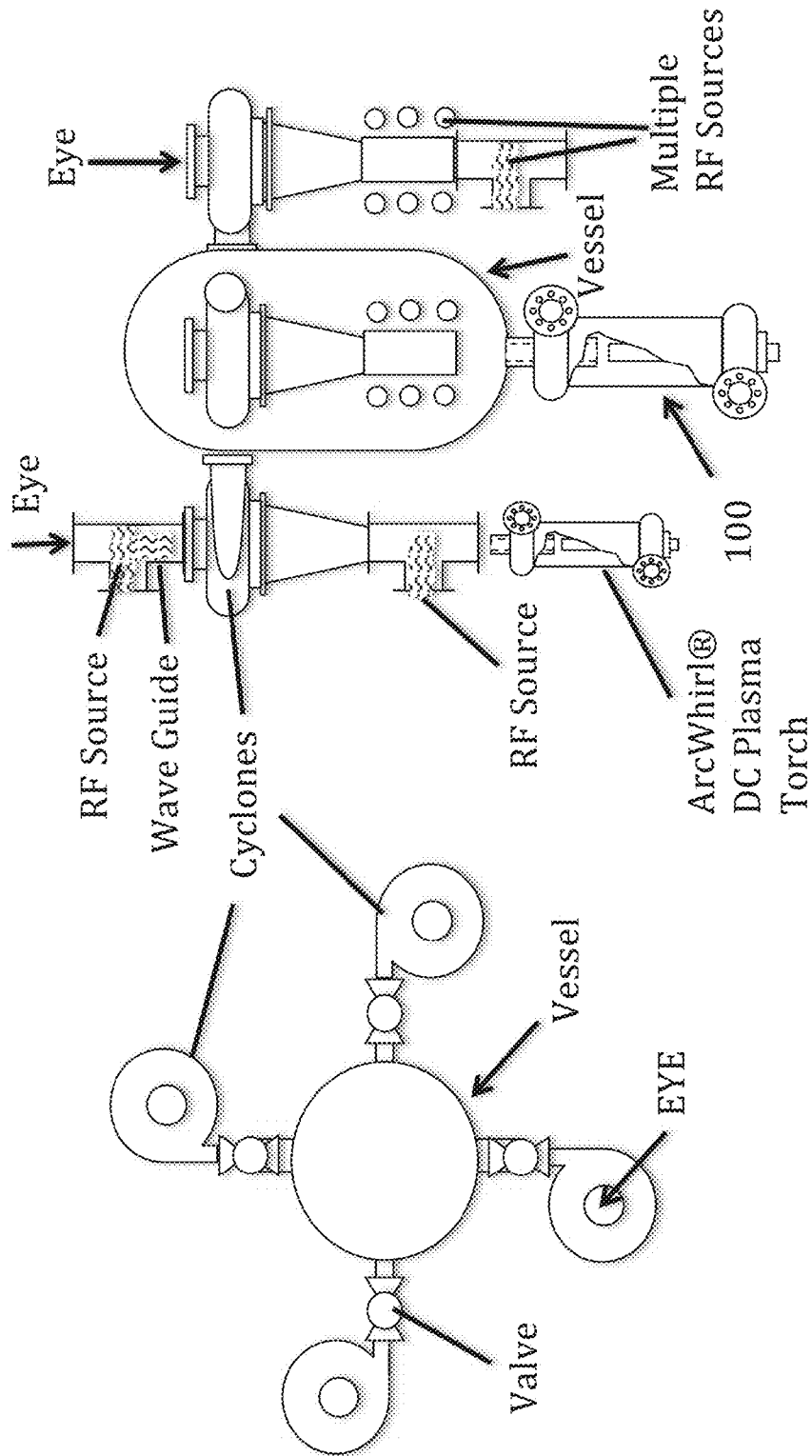

US 9,499,443 B2

APPARATUS AND METHOD FOR SINTERING PROPPANTS

PRIORITY CLAIM TO RELATED APPLICATIONS

This application claims priority to and is a non-provisional patent application of U.S. Provisional Patent Application Ser. No. 61/735,996, filed Dec. 11, 2012, the entire contents of which are incorporated herein by reference.

This application is related to PCT Patent Application Serial No. PCT/US2013/074506, filed on Dec. 11, 2013, and entitled "High Temperature Contercurrent Vortex Reactor System, Method and Apparatus."

FIELD OF THE INVENTION

The present invention relates generally to the field of hydraulic fracturing of subterranean formations in the earth and, more particularly, to a system, method and apparatus for sintering ceramic proppant particles used in the process of hydraulic fracturing of wells.

BACKGROUND OF THE INVENTION

The United States, as well as many other countries, has an abundant source of unconventional Oil and Gas resources located in shale formations. Hence, the term Shale Oil or Shale Gas. However, these tight shale formations require a unique completion method, referred to as hydraulically fracturing, to untrap the oil and/or gas and allow it to flow to the production tubing of the well. In order to keep the fractures open, the well must be propped open with a high strength material. This is similar to propping a door open with a wooden wedge or divider. However, in lieu of wooden wedge or dividers high strength material, such as frac sand and/or ceramic beads, are pumped into the well and into the fissures formed from hydraulically fracturing the well. Proppants are used to "prop" open the oil or gas well during hydraulic fracturing of the well. Hence the term "proppant."

Frac sand is traditionally used as the proppant for most hydraulically fractured wells. However, the crush strength and spherical shape of frac sand is far inferior to that of ceramic proppants. Many Oil and Gas operators have turned to ceramic proppants to improve the conductivity or flow of the well after it has been hydraulically fractured. Due to the inherit superior spherical shape of ceramic proppants over frac sand, conductivity (flow) of ceramic proppants allows for enhanced gas and/or oil flow within the well. This is crucial for maximizing flow from the well.

Carbo Ceramics, Inc. manufactures an extensive line of proppants that range from resin-coated sand to ceramic proppants. For example, US Patent Application Publication No. US 2012/20231981 A1, which is hereby incorporated by reference in its entirety, describes various processes for manufacturing proppant particles.

The major issues associated with the manufacture of ceramic proppants are cost, production capacity and emissions. The traditional method for sintering ceramic proppants uses long rotary kilns fired with natural gas. First, the construction and installation of a new rotary kiln is expensive and requires a long lead-time (e.g., upwards of 18 to 24 months), so capacity expansion is difficult. Second, if the price of natural gas increases the production costs increase. On the other hand, when the price of natural gas decreases, operators tend to not drill gas wells and/or use frac sand. As a result, sales decrease for ceramic proppants. Third, many facilities utilizing rotary kilns must install expensive scrubbers to reduce air emissions. Other issues associated with long rotary kilns are size, footprint, plant location and regulatory permits. The combination of these problems causes long lead times and thus hampers a company's ability to increase production capacity to keep up with demand of high performance ceramic proppants as compared and contrasted to frac sand.

In addition, sintering time within a rotary kiln is exceptionally long in order to reach a typical sintering temperature of 2,800° F. to 3,000° F. Typical sintering times range from 30 minutes to over one hour. If temperature creeps beyond the sintering temperature, the lower melting point metals and/or minerals within the green proppant tend to melt and "plate" out within the kiln. Thus, the rotary kiln must be shutdown, cooled and repaired and of course adversely affects the plants production capacity.

Due to the abundance of natural gas and oil from shale plays, there exists an need for an alternative means for sintering proppants without using long rotary kilns.

SUMMARY OF THE INVENTION

The present invention provides an apparatus for sintering green pellets to make proppant particles. The apparatus includes: (a) a first cylindrical vessel having a first end, a second end and a first longitudinal axis; (b) a first vortex finder connected to the first end of the first cylindrical vessel and aligned with the first longitudinal axis; (c) a second cylindrical vessel having a third end, a fourth end and a second longitudinal axis; (d) a second vortex finder connected to the second end of the first cylindrical vessel and aligned with the second longitudinal axis; (e) an inlet passage disposed between the first vortex finder and the second vortex finder, connected tangentially to both the first cylindrical vessel proximate to the first end and the second cylindrical vessel proximate to the third end, and having an inlet and a third longitudinal axis; (f) a divider disposed within the inlet passage along the third longitudinal axis that directs a heated gas from the inlet into the first cylindrical vessel to form a first vortex gas flow and the second cylindrical vessel to form a second vortex gas flow; (g) a heated gas source connected to the inlet of the inlet passage; and (h) a green pellet source connected to the first vortex finder or the second vortex finder or both the first vortex finder and the second vortex finder such that the green pellets are sintered or partially sintered in a selected temperature range to form the proppant particles as the green pellets pass through a first central portion of the first vortex gas flow and exit the second end of the first cylindrical vessel and/or pass through a second central portion of the second vortex flow and exit the fourth end of the second cylindrical vessel.

In addition, the present invention provides a method for sintering green pellets to make proppant particles. An apparatus is provided that includes: (a) a first cylindrical vessel having a first end, a second end and a first longitudinal axis; (b) a first vortex finder connected to the first end of the first cylindrical vessel and aligned with the first longitudinal axis; (c) a second cylindrical vessel having a third end, a fourth end and a second longitudinal axis; (d) a second vortex finder connected to the second end of the first cylindrical vessel and aligned with the second longitudinal axis; (e) an inlet passage disposed between the first vortex finder and the second vortex finder, connected tangentially to both the first cylindrical vessel proximate to the first end and the second cylindrical vessel proximate to the third end, and having an inlet and a third longitudinal axis; and (f) a divider disposed within the inlet passage along the third longitudinal axis. A heated gas is supplied to the inlet of the inlet passage, and the heated gas is directed into the first cylindrical vessel to form a first vortex gas flow and the second cylindrical vessel to form a second vortex gas flow using the divider. The green pellets are dropped into the first vortex finder or the second vortex finder or both the first vortex finder and the second vortex finder such that the green pellets are sintered or partially sintered in a selected temperature range to form the proppant particles as the green pellets pass through a first central portion of the first vortex gas flow and exit the second end of the first cylindrical vessel and/or pass through a second central portion of the second vortex flow and exit the fourth end of the second cylindrical vessel.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which:

FIG. 8 is a diagram of an apparatus for sintering proppants in accordance with yet another embodiment of the present invention;

FIG. 9 is a diagram of an apparatus for sintering proppants in accordance with yet another embodiment of the present invention;

DETAILED DESCRIPTION OF THE INVENTION

Figure 1:
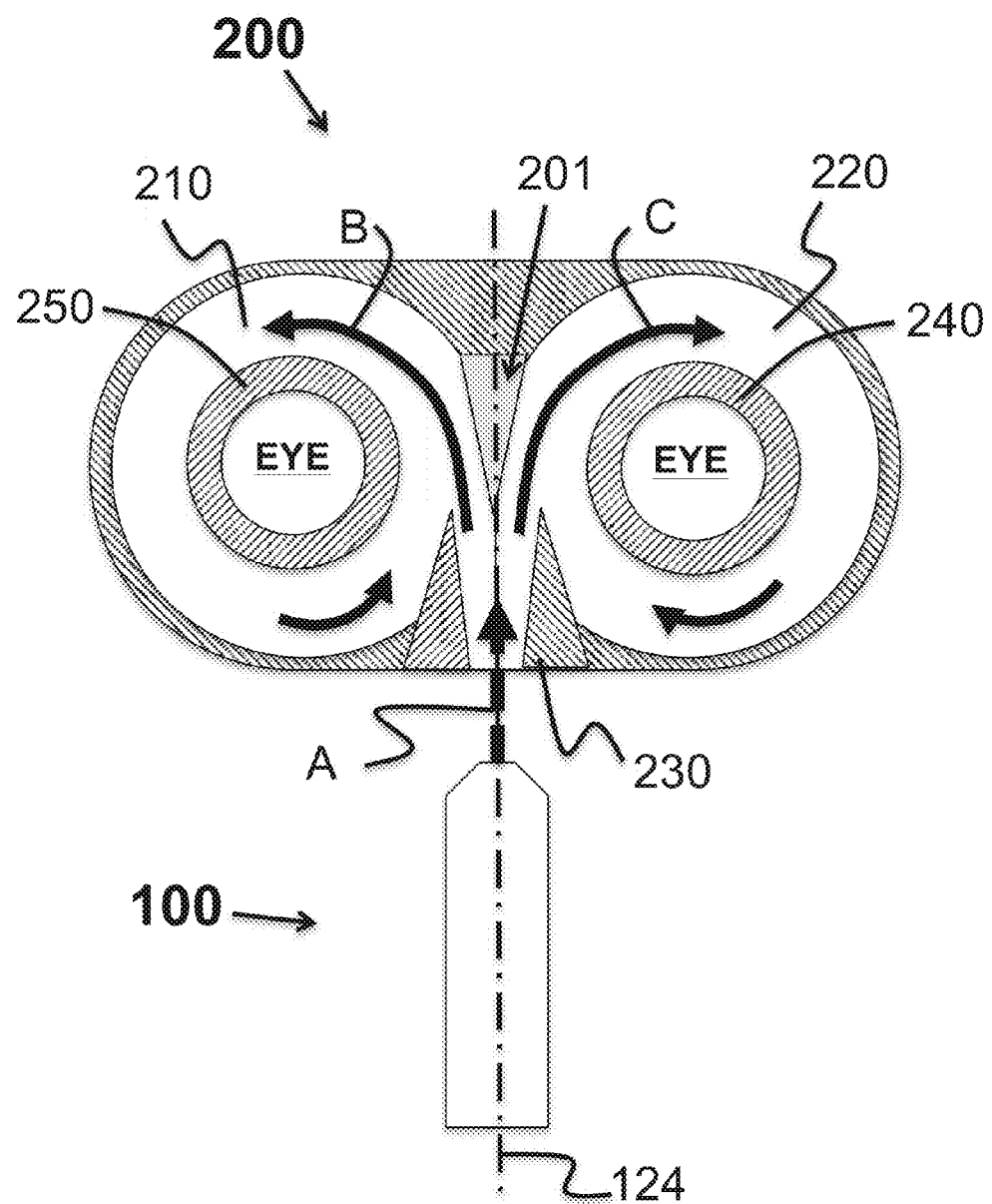
FIG. 1 is a diagram of an apparatus for sintering proppants in accordance with one embodiment of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to sintering green pellets to make proppant particles, but it will be understood that the concepts of the present invention are applicable to the manufacture or processing of particles at high temperatures.

FIGS. 1-11 show various embodiments of an apparatus for sintering proppants in accordance with the present invention is shown. The basic apparatus in accordance with these embodiments includes: (a) a first cylindrical vessel having a first end, a second end and a first longitudinal axis; (b) a first vortex finder connected to the first end of the first cylindrical vessel and aligned with the first longitudinal axis; (c) a second cylindrical vessel having a third end, a fourth end and a second longitudinal axis; (d) a second vortex finder connected to the second end of the first cylindrical vessel and aligned with the second longitudinal axis; (e) an inlet passage disposed between the first vortex finder and the second vortex finder, connected tangentially to both the first cylindrical vessel proximate to the first end and the second cylindrical vessel proximate to the third end, and having an inlet and a third longitudinal axis; (f) a wedge or divider disposed within the inlet passage along the third longitudinal axis that directs a heated gas from the inlet into the first cylindrical vessel to form a first vortex gas flow and the second cylindrical vessel to form a second vortex gas flow; (g) a heater or heated gas source connected to the inlet of the inlet passage; and (h) a green pellet source connected to the first vortex finder or the second vortex finder or both the first vortex finder and the second vortex finder such that the green pellets are sintered or partially sintered in a selected temperature range to form the proppant particles as the green pellets pass through a first central portion of the first vortex gas flow and exit the second end of the first cylindrical vessel and/or pass through a second central portion of the second vortex flow and exit the fourth end of the second cylindrical vessel.

As will be explained in more detail below, a material can be added to the first vortex gas flow or the second vortex gas flow that coats or chemically reacts with the green pellets. Moreover, the green pellets can be partially sintered in the first cylindrical vessel and sintered in the second cylindrical vessel. The selected temperature range is between about 1,200° C. and 3,700° C. In addition, the selected temperature range is typically based on a chemical composition of the green pellets, a size of the green pellets, a resonance time of the green pellets within the first cylindrical vessel, the second cylindrical vessel or both. Note that other parameters may also be used to determine the selected temperature range.

Figure 4:
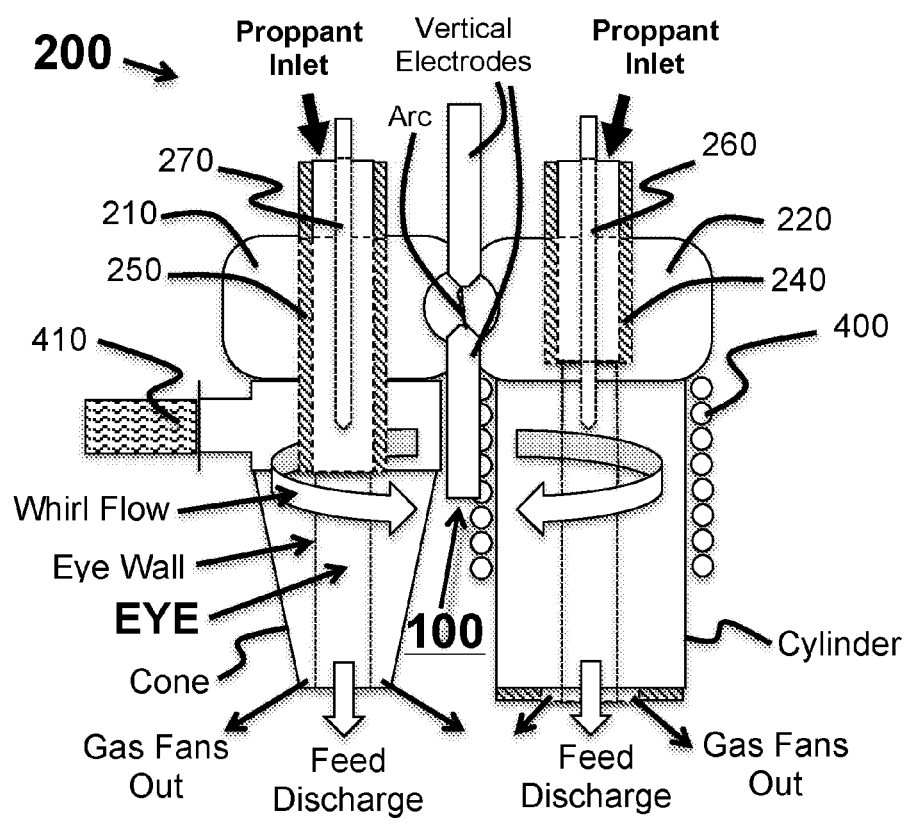
FIG. 4 is a diagram of an apparatus for sintering proppants in accordance with yet another embodiment of the present invention.
Figure 5:
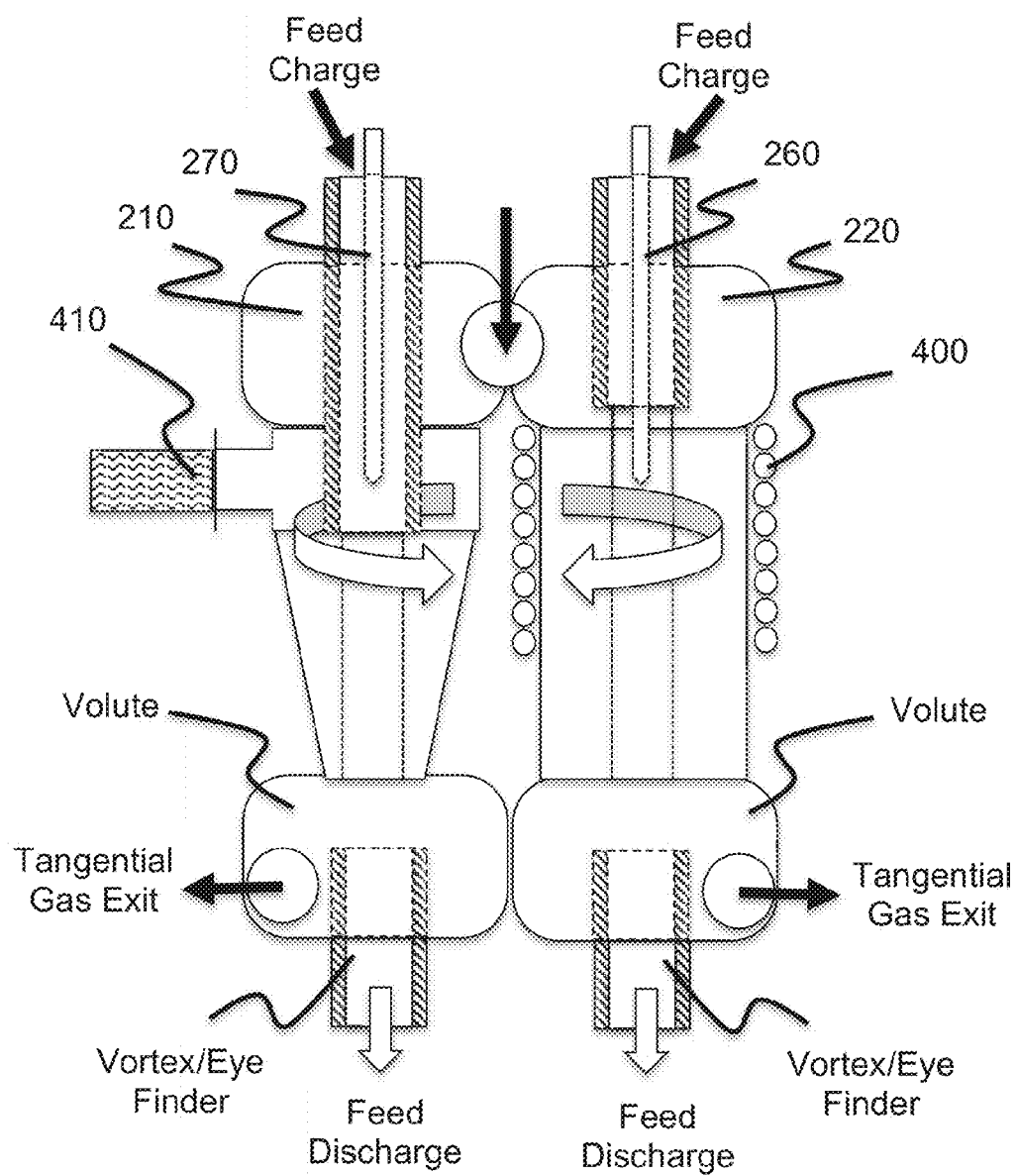
FIG. 5 is a diagram of an apparatus for sintering proppants in accordance with yet another embodiment of the present invention.
Figure 7:
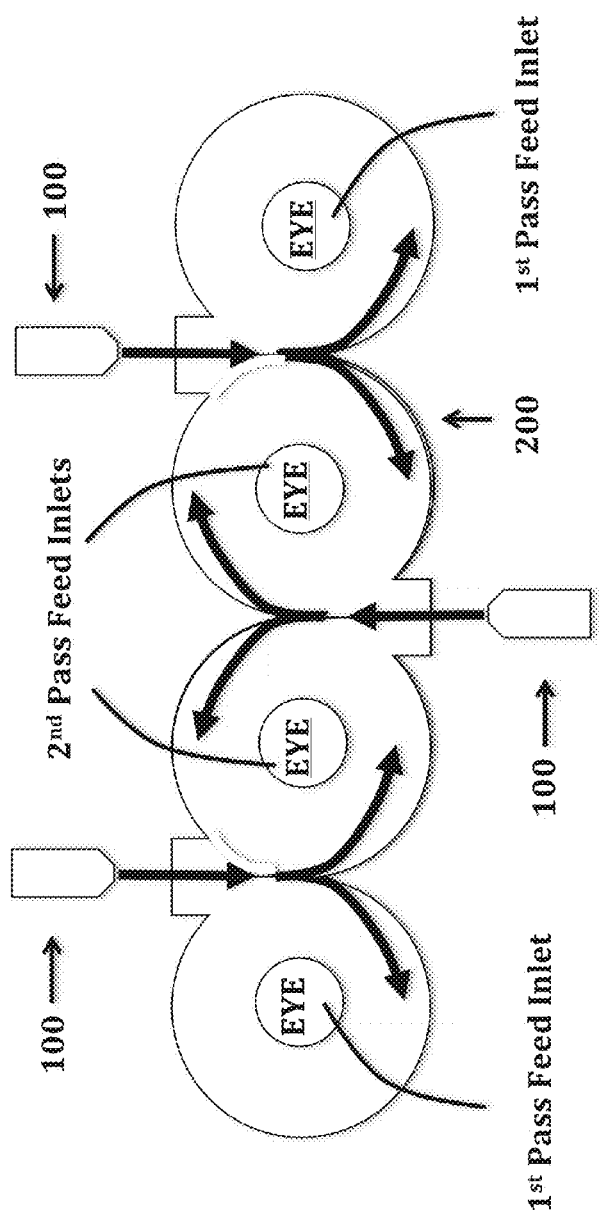
FIG. 7 is a diagram of an apparatus for sintering proppants in accordance with yet another embodiment of the present invention.

The wedge or divider can be fixed, pivotable such that first vortex gas flow is different from the second vortex gas flow, and/or moveable along the third longitudinal axis. Moreover, the wedge or divider can be an electrode or a counter current feed tube containing a material that coats or chemically reacts with the green pellets (FIG. 7). As shown in FIGS. 4 and 5, the first cylindrical vessel and the second cylindrical vessel can be cylinder-shaped or cone-shaped. Note that both cylindrical vessels can be the same shape.

Now referring to FIG. 1, a heater or heated gas source 100 is attached along a longitudinal axis 124 to a twin volute cyclone 200. The twin volute cyclone 200 consists of an entry nozzle 230 to direct a hot gas A from the heater or heated gas source 100 into the twin volute cyclone 200 and is divided by means of a wedge or divider 201. The wedge or divider 201 divides the hot gas A into a first volute annulus space 210 and its mirror image second volute annulus space 220. The wedge or divider 201 may be attached to a pivot, thus allowing for the wedge or divider to act as a gate valve for directing more or less gas into either side of the twin volutes. The gas rotates in the first volute annulus space 210 as shown by arrow B and the second volute annulus space as shown by arrow C. Each volute contains a vortex finder 240 and 250 that forms an EYE within each vortex finder 240 and 250.

Green (not sintered) proppants are very soft and can easily be crushed, shredded and/or comminuted when placed within the vortex or whirling flow of a cyclone. On the other hand, the EYE moves at a very low speed and is, therefore, an ideal Feed Point for delicate materials such as green proppants. This allows for rapid sintering of proppants (i.e., seconds as opposed to 30 minutes or more).

The heater or heated gas source 100 may be selected but is not limited to a group that includes a high temperature blower or compressor, electrical heater or heated gas source, burner, thermal oxidizer, jet rocket, oxy-fuel torch, plasma torch and/or even the exhaust from an internal combustion engine such as a reciprocating engine or gas turbine engine. The utilization of engine exhaust allows for generating electricity while sintering proppants. Hence, a unique cogenerating system—generating electricity while producing proppants. In another example, the heater or heated gas source includes a first electrode proximate to inlet of the inlet passageway and aligned with the third longitudinal axis, and the wedge or divider is a second electrode.

Figure 2:
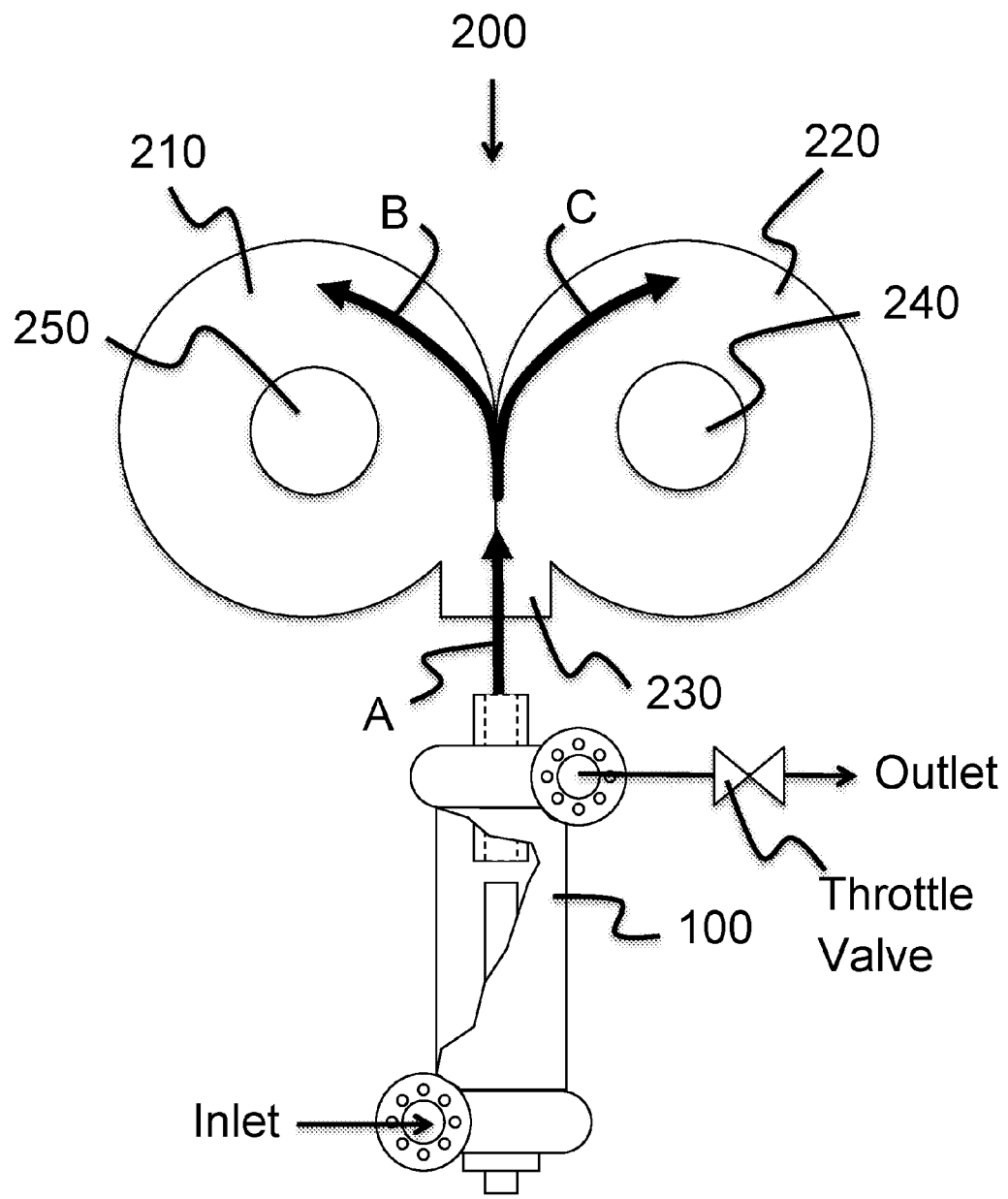
FIG. 2 is a diagram of an apparatus for sintering proppants in accordance with another embodiment of the present invention.

Turning now FIG. 2, the heater or heated gas source 100 can be the DC Plasma ArcWhirl® Torch disclosed in U.S. Pat. Nos. 8,074,439 and 8,278,810 and 7,622,693 and 8,324,523 which are hereby incorporated by reference in their entirety. Likewise, an ideal heater or heated gas source may be the thermal oxidizer shown in FIG. 6 of the '439 patent or the plasma rocket as disclosed in FIG. 7 of the '439 patent.

The heater or heated gas source includes: (a) a third cylindrical vessel having a fifth end, a sixth end and a fourth longitudinal axis; (b) a tangential inlet connected to or proximate to the fifth end; (c) a tangential outlet connected to or proximate to the sixth end; (d) an electrode housing connected to the sixth end of the third cylindrical vessel such that a first electrode is aligned with the fourth longitudinal axis of the third cylindrical vessel, extends into the third cylindrical vessel, and can be moved along the fourth longitudinal axis; (e) a linear actuator connected to the first electrode to adjust a position of the first electrode within the third cylindrical vessel along the fourth longitudinal axis of the cylindrical vessel; and (f) a hollow electrode nozzle connected to the sixth end of the third cylindrical vessel such that a center line of the hollow electrode nozzle is aligned with the fourth longitudinal axis of the fourth cylindrical vessel. The tangential inlet and the tangential outlet create a third vortex flow within the third cylindrical vessel, and the first electrode and the hollow electrode nozzle create a plasma that discharges through the hollow electrode nozzle and into the inlet of the inlet passageway.

Figure 3:
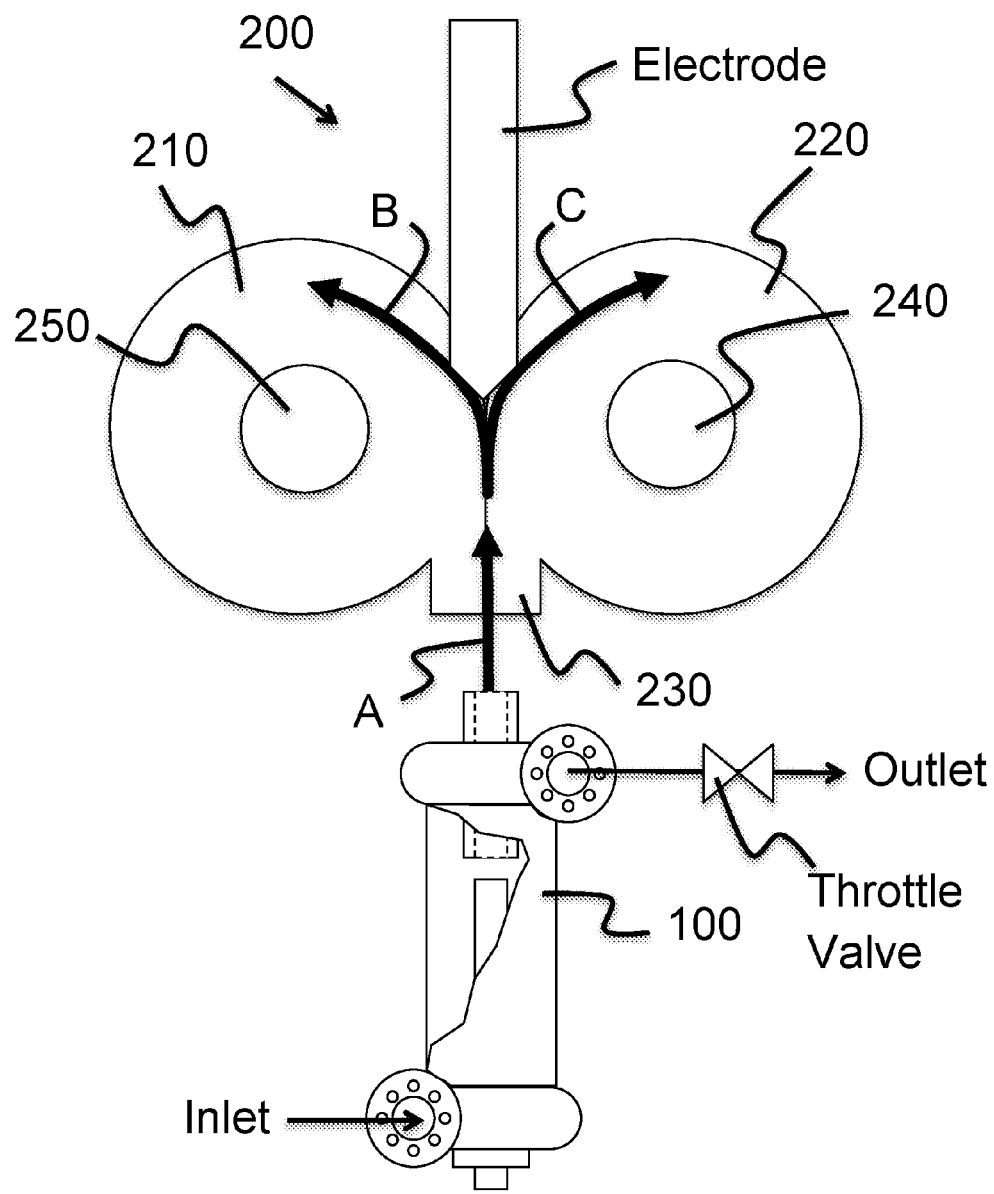
FIG. 3 is a diagram of an apparatus for sintering proppants in accordance with yet another embodiment of the present invention.

Referring to both FIG. 1 and FIG. 3 of the present invention an Electrode may be used as the wedge or divider 201 in order to transfer the arc from the DC Plasma ArcWhirl® torch 100. Likewise, continually feeding the electrode allows for continuous operation. In addition, by using graphite electrodes this adds fuel to the fire but more importantly allows for production of hydrogen via the steam reforming reaction of steam and carbon. It will be understood that any electrically conductive material may be used for the electrode. For example, copper is an ideal electrode for plasma systems since it has a high electrical conductivity as well as thermal conductivity. Consequently, by cooling the copper electrode this allows for extended operation.

The present invention can also use an electrode material that can be coated unto the proppants. For example, titanium is a lightweight electrically conductive metal that is available in rods, bars or tubes which can be fed continuously for coating the proppants with a high strength lightweight metal. On the otherhand, tungsten is a heavy electrically conductive metal that may be used to coat proppants.

Turning now to FIG. 1 and FIG. 4, the present invention will be described in another embodiment. FIG. 4 discloses a twin volute with one volute attached to a cone and the other attached to a cylinder. It will be understood that the volutes may be attached to cones or to cylinders or any other shape for practicing the present invention. The cone and cylinder attached to the twin volute is for illustrative purposes only and is not limited in scope to the present invention.

Likewise, the twin volute plasma torch is a dual inductively coupled plasma torch utilizing radio frequency in the range of 0.5 kHz to 300 MHz. A microwave source 410 and/or an induction coil 400 may be attached to or disposed within either the cone or cylinder in order to couple to the plasma generated by the plasma arc heater or heated gas source 100. The vertical configuration allows for a simple carbon arc electrode configuration 100 disposed in a vertical fashion. For example, the first electrode is proximate to the inlet of the inlet passageway and aligned in a plane substantially perpendicular to the third longitudinal axis, and the third electrode is aligned longitudinally with the first electrode such that an electrical arc between the first and second electrodes intersects the third longitudinal axis. This allows for continuously feeding both carbon electrodes.

The carbon plasma arc may provide the excitation energy for either the microwaves or RF energy to couple to and form a global plasma within the EYE. However, susceptors 270 and 260 may be located within the vortex finders 250 and 240 in order to ignite the plasma and allow for coupling and sustaining the plasma. Likewise, the inductively coupled plasma is sustained within the EYE.

In order to sinter green proppants that are fragile, the proppants are charged into the vortex finders 250 and 240 and into the EYE of the plasma Whirl®. This prevents the proppants from being disintegrated due to the high velocity of the Whirl Flow outside of the EYE. The proppants drop down the vertical axis of the EYE and through the inductively coupled plasma and are discharged through the bottom of each volutes apex that may be attached to either the cone or cylinder. The whirling mass of gas will fan out of the apex or underflow.

Plasma can couple to Radio Frequency Energy (e.g., inductively coupled ("IC") plasma torches, etc.). The present inventor's Plasma Whirl® Reactor is an IC Plasma Torch. The Radio Frequency ("RF") Spectrum ranges from about 3 kHz to 300 GHz. Induction heating commonly employs RF coils ranging in frequency from 0.5 kHz to 400 kHz. Likewise, microwave frequencies commonly found in household microwave ovens normally operate at 2,450 Mega Hertz (2.450 GigaHertz) and at a power of 300 watts to 1,000 watts. Commercial microwave ovens ranging in power from 6 kw to 100 kw typically operate at a frequency of 915 MHz (Mega Hertz).

As previously stated RF energy can couple to a gas and form plasma. Coupling efficiency is based upon several variables ranging from the gas type, gas flow rate, frequency, cavity and/or reactor shape and volume. Note that the radio frequency source can be one or more radio frequency coils, a waveguide, or a combination thereof.

The three major issues with plasma are igniting, sustaining and confining the plasma. Igniting and sustaining plasma with an electrical arc is fairly straightforward and simple. DC plasma torches utilize inertial confinement to maximize and transfer energy to the work piece. Likewise, plasma confinement is necessary to prevent melting of the torch itself.

However, plasma ignition with RF energy is quite difficult. Consequently, many RF torches using an RF coil or a Microwave source typically employ a susceptor to ignite the plasma. The susceptor is simply a pointed metal rod that will absorb the RF energy, heat up and then emit an electron via thermionic emission. As a result, the spark ignites any gases present and forms the plasma.

Turning back to FIG. 4, a susceptor 270 and 260 may be employed within each vortex finder 250 and 240 in order to ignite the plasma. However, utilizing a DC plasma torch as the heater or heated gas source 100 allows for increasing the bulk plasma volume by simply turning on the RF coil or Microwave generator and injecting WAVE ENERGY in the form of photons emitted from the RF coil or the Microwave magnetron to enhance the plasma.

Turning now to FIG. 5, a second volute may be attached to the cylinder and/or cone of the top volutes. Although the bottom volutes each disclose a tangential exit, it will be understood that a twin volute may be flipped upside down and used on the bottom thus having a single exit. This configuration is commonly referred to as a through-flow hydrocyclone. Thus, the feed charge tubes are axially and vertically aligned with the vortex/eye finder of the bottom volutes. This allows for green proppants to fall straight through the high temperature inductively coupled plasma eye and exit the feed discharge as fully sintered proppants.

For example, a third vortex finder can be connected to the second end of the first cylindrical vessel and aligned with the first longitudinal axis, and a first tangential outlet connected to or disposed proximate to the second end of the first cylindrical vessel such that the first vortex gas flow exits the first cylindrical vessel through the first tangential outlet. Likewise, a fourth vortex finder can be connected to the fourth end of the second cylindrical vessel and aligned with the second longitudinal axis, and a second tangential outlet connected to or disposed proximate to the fourth end of the second cylindrical vessel such that the second vortex gas flow exits the second cylindrical vessel through the second tangential outlet. Alternatively, the two tangential outlets can be combined into an outlet passage disposed between the first vortex finder and the second vortex finder, connected tangentially to both the first cylindrical vessel proximate to second first end and the second cylindrical vessel proximate to the fourth end, and having an outlet.

Figure 6:
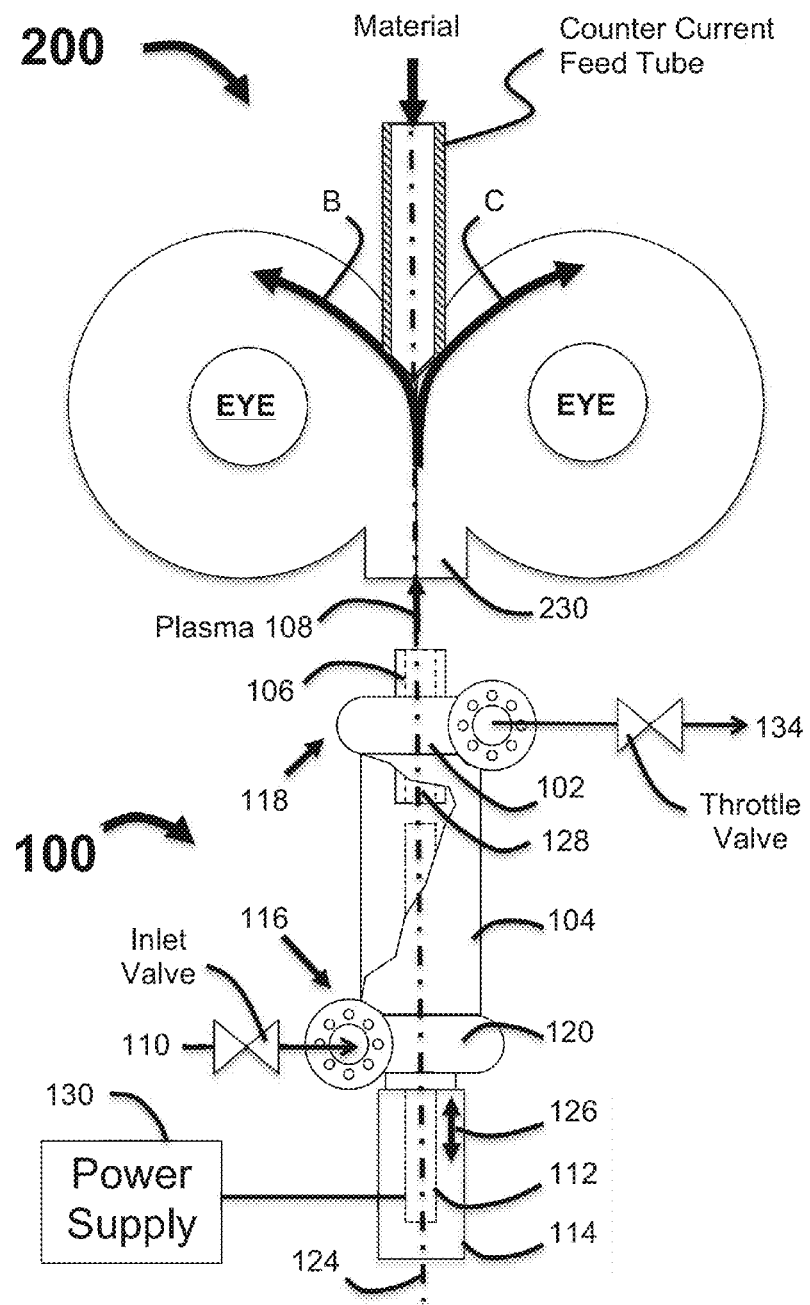
FIG. 6 is a diagram of an apparatus for sintering proppants in accordance with yet another embodiment of the present invention.

Turning now to FIG. 6 a counter current feed tube is aligned along the longitudinal axis 124 with the Plasma ArcWhirl® Torch 100. Plasma spraying and coating of materials is well known and well understood. A material may be fed into the counter current feed tube in order to coat the proppants and/or chemically react with the proppants. For example, titanium or titanium dioxide may be fed in order to coat the proppants with a nano-coating of titanium.

Although previously disclosed in the present inventor's patents, the ArcWhirl® Torch 100 will be briefly described to demonstrate the novelty and unobvious operation of attaching it to a twin volute 200. Referring to FIG. 8, a plasma arc torch 100 in accordance with one embodiment of the present invention is shown. The plasma arc torch 100 is a modified version of the ARCWHIRL® device disclosed in U.S. Pat. No. 7,422,695 (which is hereby incorporated by reference in its entirety) that produces unexpected results.

More specifically, by attaching a discharge volute 102 to the bottom of the vessel 104, closing off the vortex finder, replacing the bottom electrode with a hollow electrode nozzle 106, an electrical arc can be maintained while discharging plasma 108 through the hollow electrode nozzle 106 regardless of how much gas (e.g., air, nitrogen, helium, hydrogen), fluid (e.g., water) or steam 110 is injected into plasma arc torch 100. In addition, when a throttle valve is connected to the discharge volute 102, the mass flow of plasma 108 discharged from the hollow electrode nozzle 106 can be controlled by throttling the throttle valve while adjusting the position of the first electrode 112 using the linear actuator 114.

As a result, plasma arc torch 100 includes a cylindrical vessel 104 having a first end 116 and a second end 118. A tangential inlet 120 is connected to or proximate to the first end 116 and a tangential outlet 102 (discharge volute) is connected to or proximate to the second end 118. An electrode housing 122 is connected to the first end 116 of the cylindrical vessel 104 such that a first electrode 112 is aligned with the longitudinal axis 124 of the cylindrical vessel 104, extends into the cylindrical vessel 104, and can be moved along the longitudinal axis 124. Moreover, a linear actuator 114 is connected to the first electrode 112 to adjust the position of the first electrode 112 within the cylindrical vessel 104 along the longitudinal axis of the cylindrical vessel 124 as indicated by arrows 126. The hollow electrode nozzle 106 is connected to the second end 118 of the cylindrical vessel 104 such that the centerline of the hollow electrode nozzle 106 is aligned with the longitudinal axis 124 of the cylindrical vessel 104. The shape of the hollow portion 128 of the hollow electrode nozzle 106 can be cylindrical or conical. Moreover, the hollow electrode nozzle 106 can extend to the second end 118 of the cylindrical vessel 104 or extend into the cylindrical vessel 104 as shown. As shown in FIG. 1, the tangential inlet 120 is volute attached to the first end 116 of the cylindrical vessel 104, the tangential outlet 102 is a volute attached to the second end 118 of the cylindrical vessel 104, the electrode housing 122 is connected to the inlet volute 120, and the hollow electrode nozzle 106 (cylindrical configuration) is connected to the discharge volute 102. Note that the plasma arc torch 100 is not shown to scale.

A power supply 130 is electrically connected to the plasma arc torch 100 such that the first electrode 112 serves as the cathode and the hollow electrode nozzle 106 serves as the anode. The voltage, power and type of the power supply 130 are dependent upon the size, configuration and function of the plasma arc torch 100. A gas (e.g., air), fluid (e.g., water) or steam 110 is introduced into the tangential inlet 120 to form a vortex 132 within the cylindrical vessel 104 and exit through the tangential outlet 102 as discharge 134. The vortex 132 confines the plasma 108 within in the vessel 104 by the inertia (inertial confinement as opposed to magnetic confinement) caused by the angular momentum of the vortex, whirling, cyclonic or swirling flow of the gas (e.g., air), fluid (e.g., water) or steam 110 around the interior of the cylindrical vessel 104. During startup, the linear actuator 114 moves the first electrode 112 into contact with the hollow electrode nozzle 106 and then draws the first electrode 112 back to create an electrical arc which forms the plasma 108 that is discharged through the hollow electrode nozzle 106. During operation, the linear actuator 114 can adjust the position of the first electrode 112 to change the plasma 108 discharge or account for extended use of the first electrode 112.

Referring to FIGS. 1, 3 and 6 jointly, what is unique and unobvious to the present invention is that the arc may be blown out of the nozzle 106 and attached to the twin volute's 200 nozzle 230. Likewise, the arc may be farther transferred along the longitudinal axis 124 and attached and centered to the electrically conductive wedge or divider 201 or the electrode as shown in FIG. 3. This configuration allows for continuous use. Furthermore, the countercurrent feed tube of FIG. 6 may be electrically conductive. Likewise, although not shown a wire, stinger or electrode may be fed down the center of the countercurrent feed tube.

In previous testing of the countercurrent feed configuration carbonaceous matter was fully converted to char and then to syngas when the ArcWhirl® Torch 100 used steam as the plasma gas. Consequently, this configuration allows for the production of syngas while sintering proppants. This GREEN approach for sintering proppants allows for the production of a fuel during the sintering method.

Not being bound by theory, proppants are often made of alumina and iron, which together form a very common catalyst used for making liquid fuels from gases. This process and catalyst is referred to as Fischer Tropschs and is commonly referred to as Gas To Liquids ("GTL") when the starting fossil fuel is natural gas. Thus, in lieu of burning natural gas in a large rotary furnace, the present invention opens the door for a unique GTL process while sintering proppants. The FT reaction is an exothermic reaction. Consequently, this will aid in rapid sintering of the proppants and will help reduce the electrical load due to the plasma torch 100.

Turning now to FIG. 7 while referring to FIG. 1, the present invention twin volute plasma system may be configured similar to a chain. This configuration allows for three torches 100 to provide dual entries into two volutes. Thus, this stabilizes the EYE of the two center volutes. In addition, this allows for multiple passes of the proppants, for example a first pass and second pass, thus reducing the overall size and height of the system.

Turning now to FIGS. 8 and 9, a different approach is used to achieve the same goal—rapid sintering of proppants with multiple cyclones attached to a single gas vessel. The gas vessel allows for feeding multiple cyclones. Once again, the heater or heated gas source is an ArcWhirl Torch 100 that discharges its plasma into the vessel. Consequently, the plasma discharges into each cyclone. Each cyclone has attached to it the microwave or RF source. And of course proppants are fed into the EYE of the whirling plasma of each volute. Although not shown, it will be understood that each cyclone may be a twin volute cyclone which would be keeping in the various embodiments of the present invention.

Figure 10:
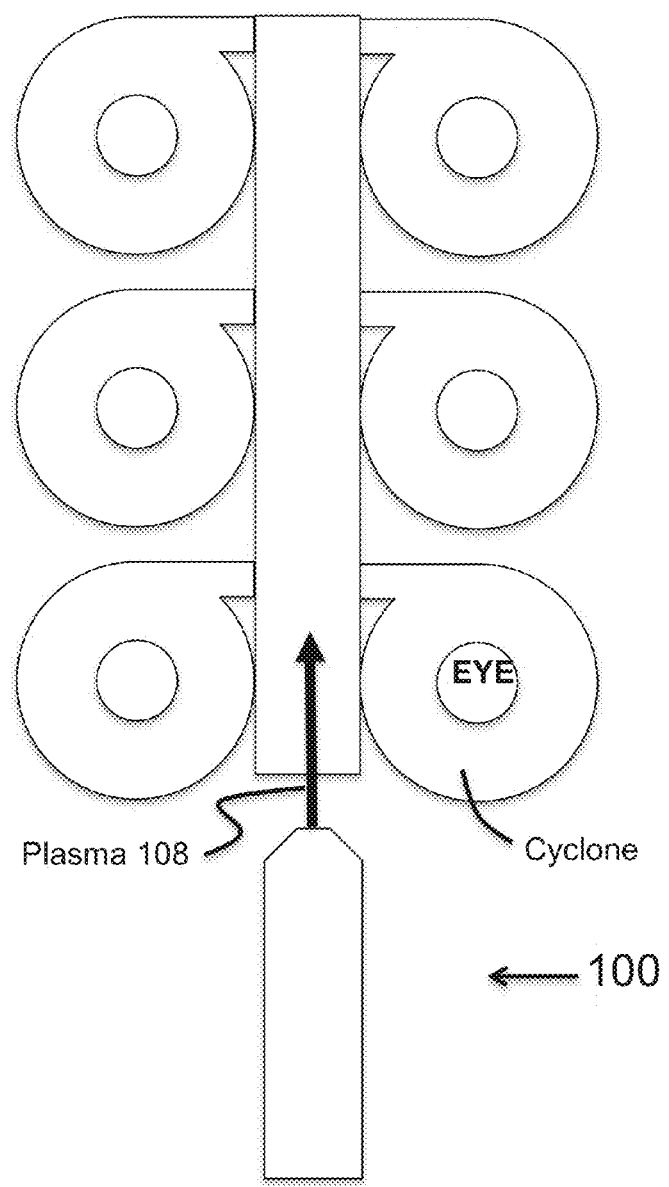
FIG. 10 is a diagram of an apparatus for sintering proppants in accordance with yet another embodiment of the present invention.
Figure 11:
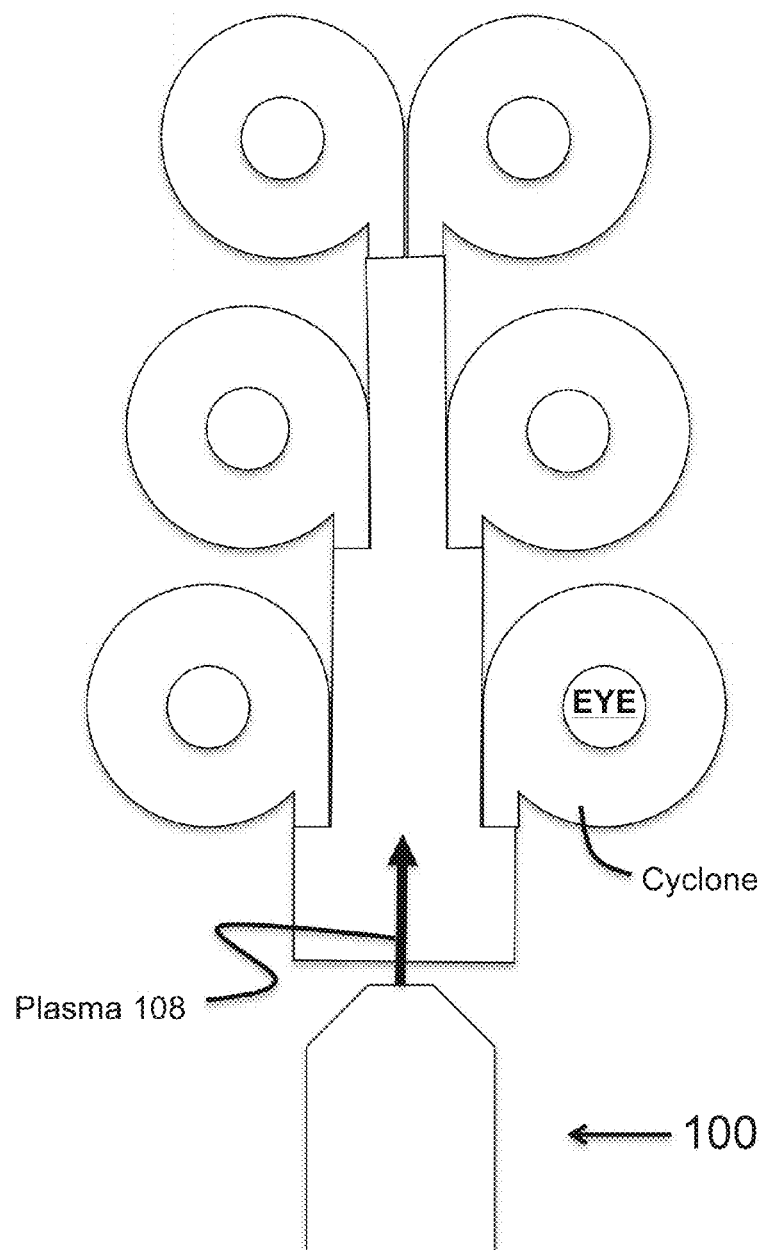
FIG. 11 is a diagram of an apparatus for sintering proppants in accordance with yet another embodiment of the present invention.
Figure 12:
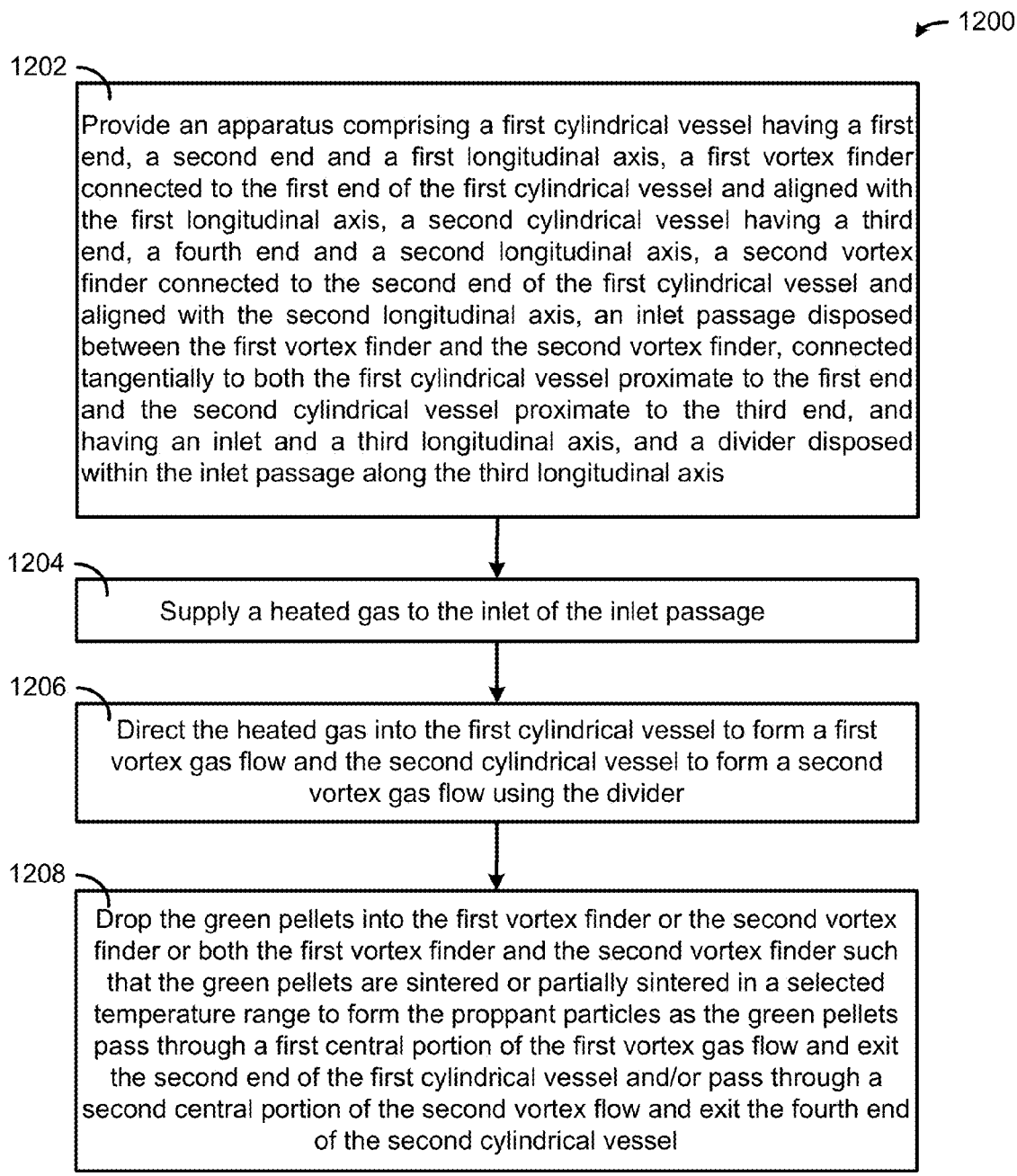
FIG. 12 is a flow chart of a method for sintering proppants in accordance with one embodiment of the present invention.

Turning now to FIGS. 10 and 11 the ArcWhirl Torch 100 may be attached to a header or conduit that feeds multiple Plasma Volutes. Although not shown the volutes may be twin volutes. Once again proppants are fed directly into the EYE of the Plasma Whirl®.

As illustrated by FIGS. 1-12 and the foregoing description, the present invention provides a method 1200 for sintering green pellets to make proppant particles. A basic apparatus is provided in block 1202 that includes: (a) a first cylindrical vessel having a first end, a second end and a first longitudinal axis; (b) a first vortex finder connected to the first end of the first cylindrical vessel and aligned with the first longitudinal axis; (c) a second cylindrical vessel having a third end, a fourth end and a second longitudinal axis; (d) a second vortex finder connected to the second end of the first cylindrical vessel and aligned with the second longitudinal axis; (e) an inlet passage disposed between the first vortex finder and the second vortex finder, connected tangentially to both the first cylindrical vessel proximate to the first end and the second cylindrical vessel proximate to the third end, and having an inlet and a third longitudinal axis; and (f) a wedge or divider disposed within the inlet passage along the third longitudinal axis. A heated gas is supplied to the inlet of the inlet passage in block 1204, and the heated gas is directed into the first cylindrical vessel to form a first vortex gas flow and the second cylindrical vessel to form a second vortex gas flow using the wedge or divider in block 1206. The green pellets are dropped into the first vortex finder or the second vortex finder or both the first vortex finder and the second vortex finder in block 1208 such that the green pellets are sintered or partially sintered in a selected temperature range to form the proppant particles as the green pellets pass through a first central portion of the first vortex gas flow and exit the second end of the first cylindrical vessel and/or pass through a second central portion of the second vortex flow and exit the fourth end of the second cylindrical vessel.

The present invention's use of multiple small diameter cyclones fed from a common header provides for a compact proppant manufacturing plant or system that is efficient and scalable. Likewise, this configuration enables the plant to increase production capacity via small increments and not through the purchase of one long rotary kiln or one large plasma process. The present invention allows the proppants to be manufactured in a multi-stage sintering process wherein addition materials can be added to, coated or reacted with the proppants to produce new and improved characteristics. Moreover, the ability to use off-the-shelf and/or modified high temperature and high pressure cyclones sourced from the oil and gas industry as a component for a plasma proppant manufacturing system allows for a relatively compact, modular and inexpensive plant that could be built in a timely fashion. Finally, the present invention provides a system that can be mounted on a skid and operated at or near the drilling operation which greatly reduces the cost of the proppants by saving expensive storage and transportation costs.

The foregoing description of the apparatus and methods of the invention in described embodiments and variations, and the foregoing examples of processes for which the invention may be beneficially used, are intended to be illustrative and not for purposes of limitation. The invention is susceptible to still further variations and alternative embodiments within the full scope of the invention, recited in the following claims.

What is claimed is:

1. A method for sintering green pellets to make proppant particles comprising the steps of:
providing an apparatus comprising:
a first cylindrical vessel having a first end, a second end and a first longitudinal axis,
a first vortex finder connected to the first end of the first cylindrical vessel and aligned with the first longitudinal axis,
a second cylindrical vessel having a third end, a fourth end and a second longitudinal axis,
a second vortex finder connected to the second end of the first cylindrical vessel and aligned with the second longitudinal axis, an inlet passage disposed between the first vortex finder and the second vortex finder, connected tangentially to both the first cylindrical vessel proximate to the first end and the second cylindrical vessel proximate to the third end, and having an inlet and a third longitudinal axis, and a divider disposed within the inlet passage along the third longitudinal axis;

supplying a heated gas to the inlet of the inlet passage;

directing the heated gas into the first cylindrical vessel to form a first vortex gas flow and the second cylindrical vessel to form a second vortex gas flow using the divider; and dropping the green pellets into the first vortex finder or the second vortex finder or both the first vortex finder and the second vortex finder such that the green pellets are sintered or partially sintered in a selected temperature range to form the proppant particles as the green pellets pass through a first central portion of the first vortex gas flow and exit the second end of the first cylindrical vessel and/or pass through a second central portion of the second vortex flow and exit the fourth end of the second cylindrical vessel.

2. The method as recited in claim 1, further comprising the step of adding a material to the first vortex gas flow or the second vortex gas flow that coats or chemically reacts with the green pellets.

3. The method as recited in claim 1, further comprising the step of adjusting the first vortex gas flow and the second vortex gas flow by pivoting the divider.

4. The method as recited in claim 1, further comprising the step of adjusting the first vortex gas flow and the second vortex gas flow by moving the divider along the third longitudinal axis.

5. The method as recited in claim 1, the green pellets are partially sintered in the first cylindrical vessel and sintered in the second cylindrical vessel.

6. The method as recited in claim 1, the heated gas is supplied by a heated gas source comprising a high temperature blower, a high temperature compressor, an electrical heater or heated gas source, a burner, a thermal oxidizer, a jet exhaust, an oxy-fuel torch, a plasma torch, an internal combustion engine exhaust, or a combination thereof.

7. The method as recited in claim 1, the first cylindrical vessel and the second cylindrical vessel are cylinder-shaped or cone-shaped.

8. The method as recited in claim 1, the selected temperature range is between about 1,200° C. and 3,700° C.

9. The method as recited in claim 1, the selected temperature range is based on a chemical composition of the green pellets, a size of the green pellets, a resonance time of the green pellets within the first cylindrical vessel, the second cylindrical vessel or both.

10. The method as recited in claim 1, the heated gas source comprises:
a third cylindrical vessel having a fifth end, a sixth end and a fourth longitudinal axis;
a tangential inlet connected to or proximate to the fifth end;
a tangential outlet connected to or proximate to the sixth end;
an electrode housing connected to the sixth end of the third cylindrical vessel such that a first electrode is aligned with the fourth longitudinal axis of the third cylindrical vessel, extends into the third cylindrical vessel, and can be moved along the fourth longitudinal axis;
a linear actuator connected to the first electrode to adjust a position of the first electrode within the third cylindrical vessel along the fourth longitudinal axis of the cylindrical vessel;
a hollow electrode nozzle connected to the sixth end of the third cylindrical vessel such that a center line of the hollow electrode nozzle is aligned with the fourth longitudinal axis of the fourth cylindrical vessel; and
wherein the tangential inlet and the tangential outlet create a third vortex flow within the third cylindrical vessel, and the first electrode and the hollow electrode nozzle create a plasma that discharges through the hollow electrode nozzle and into the inlet of the inlet passageway.

11. The method as recited in claim 1, the divider comprises a second electrode.

12. The method as recited in claim 11, the divider comprises a counter current feed tube containing a material that coats or chemically reacts with the green pellets.

13. The method as recited in claim 1, the heated gas is supplied by a heated gas source comprising:
a first electrode proximate to inlet of the inlet passageway and aligned with the third longitudinal axis; and
the divider comprises a second electrode.

14. The method as recited in claim 13, the apparatus further comprises a power source connected to the first electrode and the second electrode.

15. The method as recited in claim 13, the first electrode or the second electrode contains a material that coats or chemically reacts with the green pellets.

16. The method as recited in claim 1, the heated gas is supplied by a heated gas source comprising:
a first electrode proximate to the inlet of the inlet passageway and aligned in a plane substantially perpendicular to the third longitudinal axis; and
a third electrode aligned longitudinally with the first electrode such that an electrical arc between the first and second electrodes intersects the third longitudinal axis.

17. The method as recited in claim 1, the heated gas comprises a plasma, the first vortex gas flow comprises a first vortex plasma flow, and the second vortex gas flow comprises a second vortex plasma flow.

18. The method as recited in claim 17, the apparatus further comprises a radio frequency source attached to or disposed within the first cylindrical vessel or the second cylindrical vessel or both.

19. The method as recited in claim 18, the radio frequency source comprises one or more radio frequency coils, a waveguide, or a combination thereof.

20. The method as recited in claim 1, the apparatus further comprises:
a third vortex finder connected to the second end of the first cylindrical vessel and aligned with the first longitudinal axis;
a first tangential outlet connected to or disposed proximate to the second end of the first cylindrical vessel such that the first vortex gas flow exits the first cylindrical vessel through the first tangential outlet.

21. The method as recited in claim 1, the apparatus further comprises:
a fourth vortex finder connected to the fourth end of the second cylindrical vessel and aligned with the second longitudinal axis; and
a second tangential outlet connected to or disposed proximate to the fourth end of the second cylindrical vessel such that the second vortex gas flow exits the second cylindrical vessel through the second tangential outlet.

22. The method as recited in claim 1, the apparatus further comprises:
- a third vortex finder connected to the second end of the first cylindrical vessel and aligned with the first longitudinal axis;
- a fourth vortex finder connected to the fourth end of the second cylindrical vessel and aligned with the second longitudinal axis; and
- an outlet passage disposed between the first vortex finder and the second vortex finder, connected tangentially to both the first cylindrical vessel proximate to second first end and the second cylindrical vessel proximate to the fourth end, and having an outlet.

* * * * *